LOGIC CIRCUIT USING BINARY CORES

Filed June 20, 1956

INVENTOR.
GEORGE E. LUND

BY George Baur

ATTORNEY

United States Patent Office 2,952,841

Patented Sept. 13, 1960

2,952,841

LOGIC CIRCUIT USING BINARY CORES

George E. Lund, Havertown, Pa., assignor to Burroughs Corporation, Detroit, Mich., a corporation of Michigan Filed June 20, 1956, Ser. No. 592,646

4 Claims. (Cl. 340—174)

This invention relates to magnetic circuits generally and more particularly to logic-solving and computing circuits utilizing bistable cores having substantially square hysteresis loop characteristics.

The reliance upon bistable magnetic elements for storing and transferring or otherwise manipulating information has been treated in the prior art in articles similar to that which appeared in the May 1952 "Proceedings of the American Computing Machines," pp. 223–229, by N. B. Saunders entitled "Magnetic Binaries in the Logical Design of Information Handling Machines." The magnetic core has been finding increasing favor in the computing field because of its long life, high order of reliability, relatively low power requirements for storage and transfer of binary information, retention of information despite power failure, and other advantages.

The present invention utilizes bistable magnetic elements in conjunction with a double regenerative transfer circuit employing an amplifier, wherein the preferred amplifier is a transistor. The transistor is connected in the transfer loop that couples two or more bistable cores. Information is stored in a first core at a given time and, at some time after such storage, the information is read out of the first core into one or more additional cores. Such a first core that is switched and cleared of its information will be referred to as a transferor core. A core to which the stored information is transmitted is referred to as a transferee core.

Various transfer circuits are employed in logic-solving and computing circuits which carry out the functions of expediting or inhibiting the transfer of information from the transferor core to the transferee core. In such transfer or inhibition, it is not only desirable to obtain speed in carrying out the aforementioned steps, but is more important to obtain reliability of operation of the transfer or inhibition steps. Such reliability must be assured even when the logic-solving or computation is taking place at a very high speed.

The instant invention mains speed of operation and also attains reliability of operation of logical circuits by utilizing a transistor in the transfer loop coupling a transferor core (or cores) and a transferee core (or cores). The transistor, by having its emitter and base at the same potential, is prevented from transferring information from the transferor core to the transferee core unless the transferor binary core is switched from a predetermined stable state to its other stable state. Consequently the transistor acts as a switch that closes to allow operation of the transfer loop coupling the transferor core only when the transferor core is switched from a preselected one of its stable states to its other stable state. Moreover, the transferor core and transferee core are linked with a double regenerative set of windings wherein both the transferor core and transferee core are each regeneratively switched during a single read-out period of the transferor core, assuring that the switching of both cores will be completed once the transistor in the transfer loop is triggered into conductivity by the switching of the binary transferor core from its preselected stable state to its other stable state.

Consequently, it is an object of the instant invention to provide an improved transfer circuit for logic circuits employing binary magnetic cores.

Another object is to improve the reliability of transfer circuits employing binary magnetic cores.

Yet another object is to obtain a diodeless transfer circuit in a logical system.

The aforementioned objects and other advantages that are obtained in the practice of the present invention will become apparent from the detailed description of the invention that follows wherein.

Prior to describing the invention and its modifications, the conventional notation employed herein will be defined. The binary magnetic cores used in the logic or information storage circuits of this invention are composed of suitable magnetic material ordinarily having the property of low coercive force and high residual magnetism and which may be readily magnetized in either one of two directions. One direction or stable remanence state will represent the storage of a binary "1" whereas the opposite state of magnetic remanence will represent the storage of a binary "0." Further conventional notation deals with the "dot" representation of switching current applied to a winding associated with a core. When a pulse of positive current enters the dotted terminal of a winding coupled to a core, such current pulse will tend to switch the core toward its "0" remanence state. When such a current pulse enters the undotted terminal of a winding coupled to a core, such current pulse will tend to switch the core toward its "1" remanence state.

Figure 1:
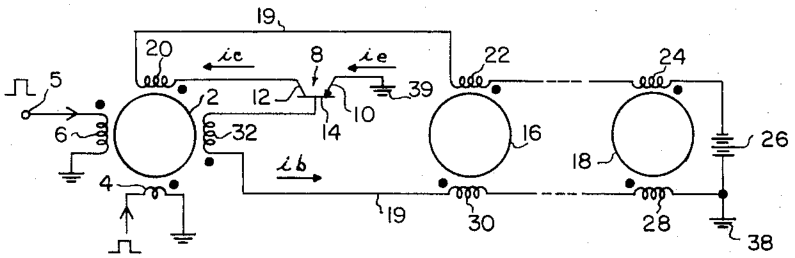
Fig. 1 is a schematic electrical circuit of an embodiment of the invention.

Referring now to Fig. 1, there is shown a binary magnetic core 2 represented symbolically by a circle. Conventionally the core 2 may have the form of a generally toroidal body of ferromagnetic material, preferably having the square loop characteristic referred to hereinabove. Core 2 is normally set to its "1" state by a current pulse entering the undotted terminal of winding 4 that is coupled to core 2. Core 2 is normally set to its "0" state by current entering the terminal 5 at the dotted end of winding 6. An amplifying device, which could be a vacuum tube amplifying circuit, but is shown in its preferred form as a transistor 8, comprising grounded emitter 10, collector 12 and base 14, is included in a transfer loop 19 that couples transferor core 2 to a group of transferee cores, only two of which, namely, cores 16 and 18, are shown. A winding 20, coupled to to core 2, has its dotted terminal connected to the transistor collector 12 and its undotted terminal connected to the undotted terminal of winding 22, such winding 22 being coupled to the transferee core 16. Winding 22 is connected to the winding coupled to another transferee core (not shown) adjacent to core 16. Winding 24 is a winding that is associated with the last core 18 in a chain or group of transferee cores. The dotted terminal of winding 24 is connected to the negative terminal of battery 26 and the positive terminal of the battery is connected to the undotted terminal of another winding 28 associated with core 18. Winding 30 and winding 32 associated with cores 16 and 2, respectively, complete the transfer loop 19, wherein the undotted terminal of winding 32 is conected to the base 14 of transistor 8.

Transistor 8 is of the p-n-p type wherein the transistor acts as an open switch when the base 14 is positive with respect to both the emitter 10 and collector 12, permitting little if any current to flow in the emitter-collector circuit. When the base 14 is negative with respect to the emitter 10, the transistor acts effectively as a closed switch, permitting current to flow in the emitter-collector circuit.

Assume that core 2 is switched from its "0" state to its "1" state by a current pulse that enters the undotted terminal of winding 4. When current flows into the undotted terminal of winding 4 to switch core 2 to its "1" state, output winding 32, which is coupled to core 2, will have a voltage induced therein that will tend to oppose such change of state of core 2. Such induced voltage will make the undotted terminal of winding 32 positive and the dotted terminal of winding 32 negative. Consequently the base 14 of transistor 8 will be given a positive potential due to the switching of core 2 from its "0" state to its "1" state, making the transistor 8 behave as an open circuit and preventing any flow of information through the transfer loop circuit while the core 2 is being switched to its "1" state.

When core 2 is interrogated or read-out by a current pulse applied at input terminal 5 to cause current flow into the dotted terminal of winding 6, core 2 begins switching to its "0" state causing the dotted terminal of winding 32 to be positive and its undotted terminal to be negative. Consequently base 14 of transistor 8 is given a negative polarity, triggering the transistor to conductivity. Winding 32 may be deemed the trigger winding because the polarity of the voltage induced across it by the switching of core 2 from one remanent state to another determines whether or not the transistor 8 will become conducting.

As soon as transistor 8 begins to conduct, current is drawn from the positive terminal of battery 26 and can be traced from such positive terminal through grounded points 38, 39, emitter 10, collector 12, switching winding 20, through the undotted terminals of switching windings 22 and 24, and back to the battery 26 via its negative terminal. Core 2 began its switching toward its "0" state upon application of a current pulse at input terminal 5, and as soon as transistor 8 has become conductive because of the induced negative polarity appearing at the base 14 of transistor 8, the aforementioned current from the D.-C. source 26 applied switching energy to core 2 through the dotted terminal of winding 20 to tend to switch core 2 toward its "0" state. Switching winding 20 is regeneratively coupled to trigger winding 32 through the transistor circuit so that as current flows from battery 26 through transistor 8 into the dotted terminal of winding 20 to continue the switching of core 2 toward its "0" state, a voltage is induced in trigger winding 32 of a polarity to apply a negative voltage to base 14. Such induced voltage maintains transistor 8 as a closed switch, assuring the complete switching of core 2 to its "0" state even after the termination of the current pulse that was applied to terminal 5 of input winding 6 to start the switching of core 2 toward its "0" state.

It is noted at this point that the emitter current, represented symbolically as $i_e$, that enters the transistor 8 through emitter 10, splits up into two branches. One branch goes through the collector and is referred to as $i_c$ and the other branch goes through the base and is termed $i_b$. Obviously $i_e=i_c+i_b$. However the path for $i_c$ always includes the battery 26 whereas the path for $i_b$ never includes the battery. Consequently the transistor circuit is designed to make $i_c>i_b$ so that more current goes through switching windings 20, 22 and 24 than goes through trigger windings 28, 30 and 32. The $i_c$ path can be traced from the battery 26, grounded points 38, 39, emitter 10, collector 12, windings 20, 22, 24, and back to battery 26. The base current $i_b$ flows in the closed loop that consists of grounded point 39, emitter 10, base 14, trigger windings 32, 30, 28 and back to ground point 38.

The binary "1" information stored in core 2 has been regeneratively read-out of core 2 in the aforementioned manner, restoring core 2 to its "0" state, and it is desired to transfer such read-out information to one or more transferee cores 16, 18, etc. Operation when binary "0" is stored in core 2 is discussed in connection with the modified circuit of Fig. 5. The instant invention relies upon another regenerative coupling of windings associated with cores 16, 18, etc. that includes the transistor 8 in its circuit. As soon as transistor 8 acts as a closed switch due to the presence of a switching pulse at terminal 5, which starts the switching of core 2 toward its "0" state, current flows as was described above from battery 26, ground terminals 38 and 39, emitter 10, collector 12, winding 20, through windings 22, 24, etc., and back to battery 26. As current enters the undotted terminals of windings 22, 24, etc. cores 16, 18, etc. begin to switch toward their respective "1" states. The switching of cores 16, 18, etc. toward their respective "1" states by means of currents flowing into the undotted terminals of windings 22 and 24 induces potentials in regeneratively coupled windings 30, 28, etc. such that the dotted terminals of such windings will be negative and the undotted terminals will be positive. The negative potentials induced additively at the dotted terminals of windings 30, 28, etc. appear as a negative potential at base 14 of transistor 8. Thus windings 30 and 28 serve as trigger windings in the switching of cores 16 and 18, so that the regenerative coupling of such windings as windings 22 and 30 continues to keep transistor 8 in its closed switch condition until cores 16, 18, etc. have been completely switched to their respective "1" states. Any desired utilization may be made of the information thus stored in these cores; for example, other means, not shown, may be relied upon to read out at a later time the information read into cores 16, 18, etc., and transfer such information to other storage circuits not shown. Since such retransfer of information does not form any part of the instant invention, there is no need to describe such retransfer means.

Figure 2:
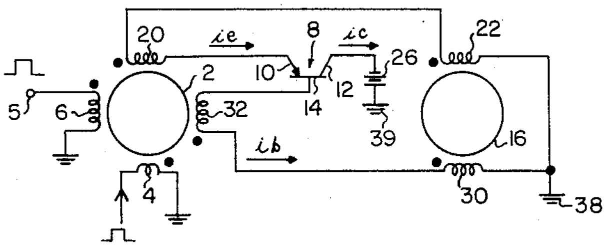
Figs. 2, 3 and 4 are schematic electrical circuits of other embodiments of the invention showing different ways in which the transistor may be connected to the regenerative windings in the transfer circuit.

Fig. 2 employs the transistor 8 and battery 26 in a different manner than that shown in Fig. 1 without losing the advantageous double regenerative switching achieved in the circuit of Fig. 1. It is noted that Fig. 2 shows only a single transferee core instead of the plurality of transferee cores depicted in Fig. 1. As is readily seen in Fig. 2, when core 2 is being switched from its "1" state to its "0" state because of the application of a current pulse at terminal 5 of input winding 6, a negative voltage appears at the undotted terminal of trigger winding 32 causing the base 14 of transistor 8 to become momentarily negative with respect to emitter so that the transistor 8 effectively acts as a closed switch. Emitter current $i_e$ flows into the transistor 8 and splits into two branches, $i_c$ and $i_b$. The collector current $i_c$ is traced from collector 12, battery 26, grounded terminals 39, 38, through the undotted terminal of switching winding 22, the dotted terminal of winding 20, and back to the emitter 10. The base current $i_b$ is traced from the emitter 10, through undotted terminal of trigger winding 32, through dotted terminal of trigger winding 30, through undotted terminal of switching winding 22, through dotted terminal of switching winding 20 and back to emitter 10.

It is noted that the base current $i_b$ flowing in trigger winding 32 creates a magnetic flux that opposes the magnetic flux created in switching winding 20 by collector current $i_c$ flowing through winding 20. But $i_c>>i_b$, so the magnetic flux created in switching winding 20 overrides the magnetic flux created in trigger winding 32 and is effective to continue the switching of core 2 toward its "0" state. In a like manner the base current $i_b$ flowing through the dotted terminal of trigger winding 30 creates a magnetic flux that opposes the magnetic flux created in switching winding 22 by the collector current $i_c$ that flows through the undotted terminal of winding 22. But since $i_c >> i_b$, the magnetic flux created in winding 22 overrides the magnetic flux created in trigger winding 30 to start the switching of transferee core 16 toward its "1" state. Since windings 20 and 32 and windings 22 and 30 are regeneratively coupled, the base 14 of the transistor is maintained at a negative potential until core 2 and core 16 have completely switched, carrying out the transfer of information from core 2 to core 16.

Figure 3:
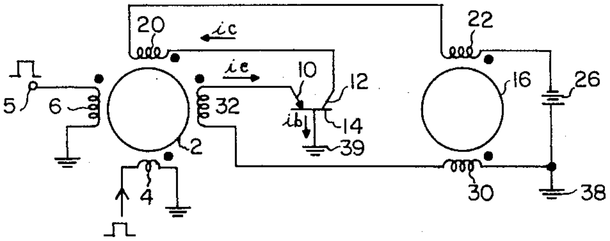

Fig. 3 is yet another manner of connecting a transistor to the other elements that form the double regenerative transfer loop of this invention. In the embodiment of Fig. 3, the trigger winding 32 has a positive potential induced at its dotted terminal when core 2 begins to switch toward its "0" state when a current pulse appears at terminal 5 of interrogation winding 6. This induced positive potential makes emitter 10 positive so that a current path $i_e$ may be traced from battery 26, trigger winding 30, trigger winding 32, emitter 10, where it splits to form a current path $i_c$ from collector 12, switching winding 20, switching winding 22, and back to battery 26. It is noted that in Fig. 3 the regenerative coupling of windings 20 and 32 and that of windings 22 and 30 are such as to maintain a positive potential at emitter 10 which keeps the transistor 8 in its closed switch position, instead of maintaining a negative potential at base 14 as was disclosed in Figs. 1 and 2. The induced current path $i_b$ can be traced from base 14, ground points 39, 38, through dotted terminal 30, through undotted terminal 32 and back to emitter 10. Again the condition $i_c >> i_b$ maintains.

Figure 4:
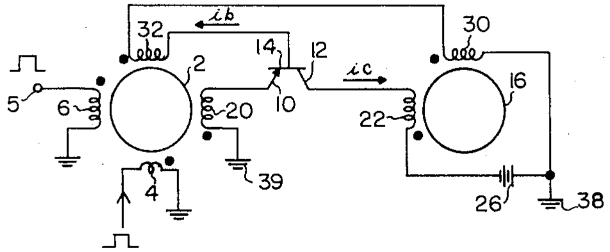

Fig. 4 represents still another way, different from those shown in Figs. 1, 2 and 3, of connecting transistor 8 in the double regenerative transfer loop that couples the transferor core 2 to the transferee core 16. When core 2 begins to switch from its "1" state towards its "0" state, the voltage induced in trigger winding 32 is such as to make base 14 more negative than emitter 10, causing switching current $i_c$ to flow from battery 26, grounded points 38, 39, through dotted terminal of switching winding 20, emitter 10, collector 12, switching winding 22 of core 16 and back to battery 26. The base current $i_b$ can be traced from emitter 10, base 14, trigger windings 32, 30, grounded points 38, 39, switching winding 20 and back to emitter 10. It is readily seen that the regenerative switching of cores 2 and 16 is maintained by the action of trigger windings 32 and 22, each of which applies a negative potential to base 14 until cores 2 and 16 complete their switching.

Figure 5:
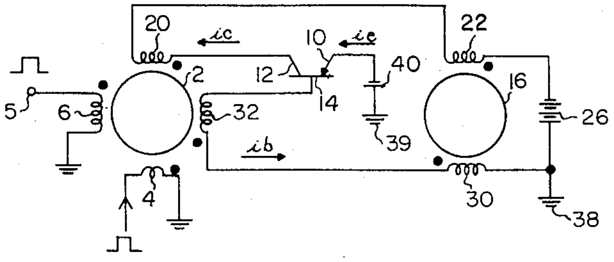
Fig. 5 illustrates the invention with a bias applied to the emitter circuit of the transistor of Fig. 1.

This circuit of Fig. 5 is similar to Fig. 1 save that a negative bias is applied to emitter 10 of transistor 8 by interposing a battery 40 between emitter 10 and ground 39. The use of a biased emitter serves to prevent the triggering of transistor 8 by spurious "1" signals. For example, when core 2 is in its "0" binary state, current entering the dotted terminal of winding 6 will merely drive core 2 further along the saturation line of its B-H hysteresis loop in the direction of its "0" state. Where core 2 is one that has a rectangular hysteresis loop, substantially no flux cuts across windings 20 and 32 when core 2 is so driven. Where core 2 is a "non-rectangular" core, or a core whose B-H hysteresis loop deviates from a rectangular loop, a core, such as core 2, when it is in its "0" state will, when driven by a current pulse along its saturation curve, cause a partial "1" to be read out of core 2. Such partial "1" causes the undotted terminal of trigger winding 32, and hence base 14, to become negative. Consequently transistor 8 might be prematurely fired and cause a "1" to be read into core 16. To avoid such spurious transfer, a threshold bias is applied to emitter 10 from battery 40. This bias further assures that transistor 8 will remain open even is a "non-square" core 2, already in its "0" state, is driven again toward its "0" state, but said transistor will become conductive when core 2 is driven from its "1" state to its "0" state. Trigger windings 32 and 30 and switching windings 20 and 22 serve the same function in Fig. 5 as they do in the previous figures.

It is to be understood that there are various other combinations for inserting the amplifying device, such as, though not necessarily, a transistor in the double regenerative circuit of the instant invention, but all of them will have the common desirable feature, namely, that the transferor core, once it has been triggered to switch from its "1" state to its "0" state will not only continue to switch to its "0" state but the double regenerative circuit will continue to operate as a closed circuit until the transferee cores have completed their switching to their respective "1" states. Moreover, the present invention also avoids the reliance on critical components. Cores need not have square hysteresis loop characteristics. The switching times of the cores in a logic circuit need not be as carefully controlled as was needed prior to the advent of this invention.

What is claimed is:

1. In combination; a transfereor magnetic core and a transferee magnetic core, each of said cores being capable of assuming either of two stable states of magnetic remanence, each of said cores having at least two windings magnetically coupled thereto; a transfer circuit coupling said transferor and transferee cores, said transfer circuit including but a single amplifier, said amplifier having input and output circuits, one of said windings on each of said cores being connected in series in the input circuit of said amplifier, the other of said windings on each of said cores being connected in series in the output circuit of said amplifier, said two windings on said transferor core (one in the input circuit and the other in the output circuit of said amplifier) being wound to be inductively coupled together regeneratively for maintaining said amplifier conducting at least so long as said transferor core is switching, said two windings on said transferee core (one in the input circuit and the other in the output circuit of said amplifier) being wound to be inductively coupled together regeneratively for maintaining said amplifier conducting at least until said transferee core has completed its switching from one stable state to the other; means for normally biasing said amplifier into non-conduction; and means for applying an input trigger pulse to said transferor core to initiate switching of said transferor core from one of its stable states to the other for inducing a voltage in the amplifier input circuit winding of said transferor core of a polarity and magnitude to override said amplifier normal bias and to drive said amplifier into conduction, whereby said amplifier remains conducting until the last of said cores to complete its switching has completed its switching from one stable state to the other.

2. Apparatus as claimed in claim 1 characterized in that said amplifier is a transistor.

3. Apparatus as claimed in claim 2 characterized in that said input circuit of said transistor amplifier comprises the base-emitter circuit and in that said output circuit comprises the collector-emitter circuit.

4. Apparatus as claimed in claim 3 characterized in that said input circuit of said transistor amplifier comprises the emitter-base circuit and in that said output circuit comprises the collector-base circuit.

References Cited in the file of this patent

UNITED STATES PATENTS

| | | |
|---|---|---|
| 2,695,993 | Haynes | Nov. 30, 1954 |
| 2,747,110 | Jones | May 22, 1956 |

(Other references on following page)

OTHER REFERENCES

"Special-Purpose Digital Data-Processing Computers," by B. M. Gordon and R. N. Nicola, published May 2, 1952, "Proceedings of the ACM," pp. 33–45.

"A Predetermined Scaler Utilizing Transistors and Magnetic Cores," by R. I. Van Nice, and R. C. Lyman, published October 3–5, 1955, "Proceedings of the National Electronics Conference," vol. XI, pp. 859–869.

"A Transistor-Magnetic Core Circuit," by Gutterman and Carey, pub. 1955, "IRE Convention Record Part 4," pp. 84–94.